(12) United States Patent
Cheron et al.

(10) Patent No.: US 11,981,439 B2
(45) Date of Patent: May 14, 2024

(54) AIRCRAFT SEAT PROVIDED WITH A RACK MOUNTED ON A DEFORMABLE PORTION

(71) Applicant: Safran Seats, Plaisir (FR)

(72) Inventors: Christophe Cheron, Aize (FR); Ronan Lesueur, Issoudun (FR); Christian Verny, Issoudun (FR)

(73) Assignee: Safran Seats, Plaisir (FR)

( * ) Notice: Subject to any disclaimer, the term of this patent is extended or adjusted under 35 U.S.C. 154(b) by 315 days.

(21) Appl. No.: 17/437,267

(22) PCT Filed: Feb. 28, 2020

(86) PCT No.: PCT/EP2020/055305
§ 371 (c)(1),
(2) Date: Sep. 8, 2021

(87) PCT Pub. No.: WO2020/182493
PCT Pub. Date: Sep. 17, 2020

(65) Prior Publication Data
US 2022/0135233 A1   May 5, 2022

(30) Foreign Application Priority Data
Mar. 8, 2019  (FR) ...................................... 1902363

(51) Int. Cl.
B64D 11/06    (2006.01)
(52) U.S. Cl.
CPC .... B64D 11/0696 (2013.01); B64D 11/06395 (2014.12); B64D 11/0689 (2013.01)
(58) Field of Classification Search
CPC .......... B64D 11/06395; B64D 11/0696; B64D 11/0689; B64D 11/0619; B60N 2/1635;
(Continued)

(56) References Cited

U.S. PATENT DOCUMENTS 2,117,409 A * 5/1938 Dorsey .................... B60N 2/06
                                                  296/68
2,924,265 A * 2/1960 Himka ................. B60N 2/0284
                                                  74/89.32
(Continued)

FOREIGN PATENT DOCUMENTS

DE      3409582 A1    9/1985
DE      4216300 A1    11/1993
EP      0385289 A2    9/1990

OTHER PUBLICATIONS

International Patent Application No. PCT/EP2020/055305, International Search Report (with English translation) and Written Opinion, dated May 15, 2020.

*Primary Examiner* — Christopher Garft
(74) *Attorney, Agent, or Firm* — Kilpatrick Townsend & Stockton LLP

(57) ABSTRACT

The present invention relates to an aircraft seat comprising:
  a guide rail (26);
  a rack (34);
  an actuator (30) provided with a gear (31);
  at least one connection portion (35) providing a mechanical connection between the guide rail (26) and the rack (34),
characterized in that the connection portion (35) included a zone (36) of mechanical weakness and in that a first bearing element (37) and a second bearing element (38) are disposed on either side of the rack (34), such that, if the deformation of the seat generates a movement of the gear (31), said gear (31) or the corresponding shaft (32) comes into abutment against one of the bearing elements (37, 38) and in this way deforms the connection portion (35) along the zone (36) of mechanical weakness.

11 Claims, 5 Drawing Sheets

(58) Field of Classification Search
CPC .............. B60N 2/02253; B60N 2/0276; B60N 2/1875; B60N 2/02246; B60N 2/06; B60N 2/067; F16H 57/0006
See application file for complete search history.

(56) References Cited

U.S. PATENT DOCUMENTS

| | | | | |
|---|---|---|---|---|
| 4,089,500 | A * | 5/1978 | Gustafsson | B60N 2/0875 248/429 |
| 4,272,048 | A * | 6/1981 | Kluting | B60N 2/02246 403/1 |
| 4,304,386 | A * | 12/1981 | Nagashima | B60N 2/06 248/429 |
| 4,364,536 | A * | 12/1982 | Kluting | B60N 2/067 248/420 |
| 4,842,232 | A * | 6/1989 | Pipon | B60N 2/1832 297/344.1 |
| 5,722,617 | A * | 3/1998 | Cecinas | B64D 11/064 296/68.1 |
| 7,036,883 | B1 * | 5/2006 | Thompson | B60N 2/06 297/344.24 |
| 2001/0015401 | A1 * | 8/2001 | Yoshida | B60N 2/0868 296/65.14 |
| 2016/0264024 | A1 * | 9/2016 | Michels | B60N 2/0825 |

* cited by examiner

[Fig. 1]
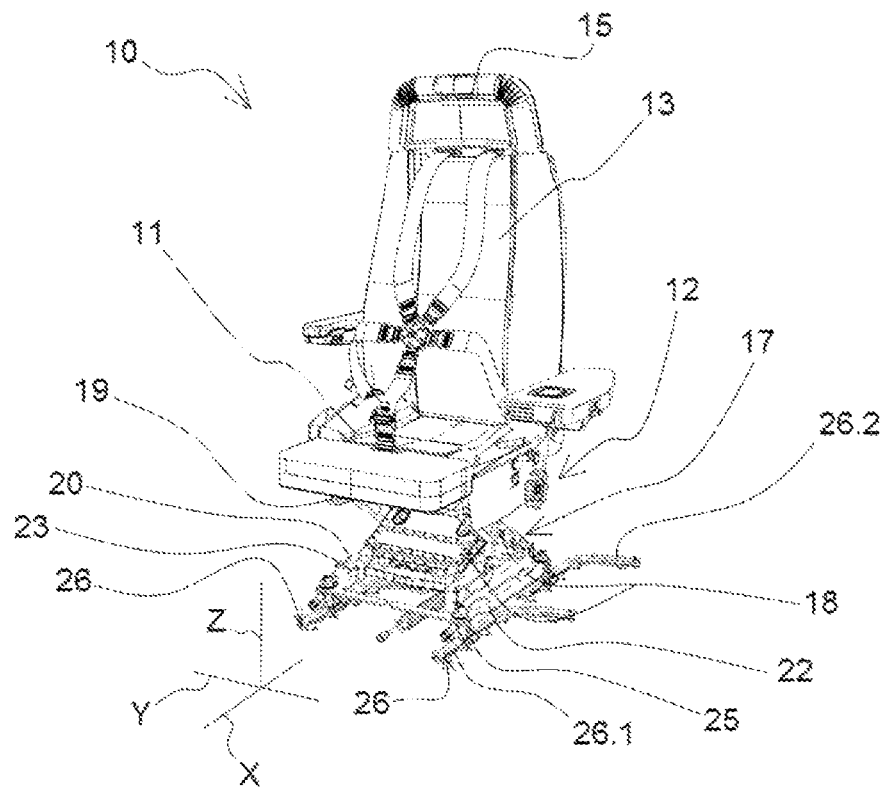
[Fig. 2]
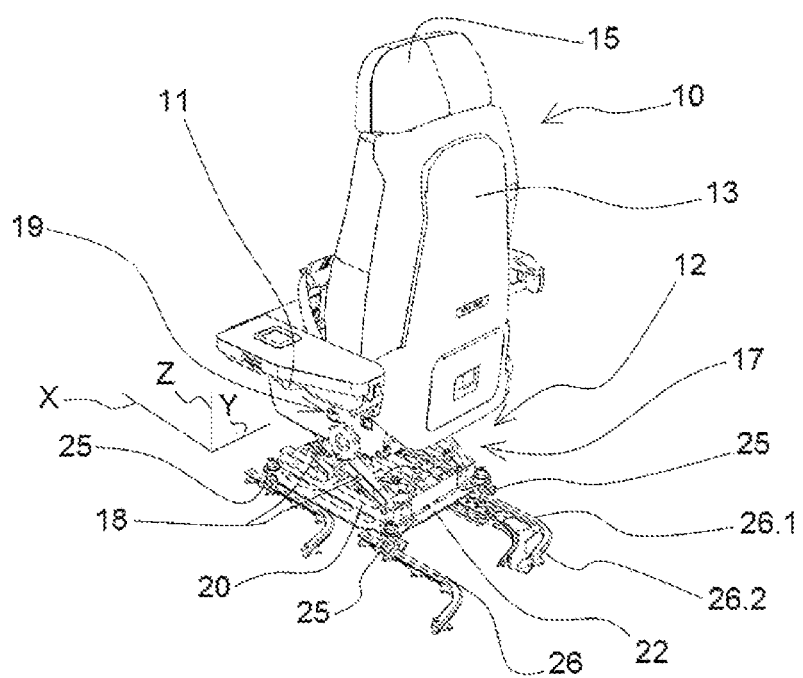

[Fig. 3]
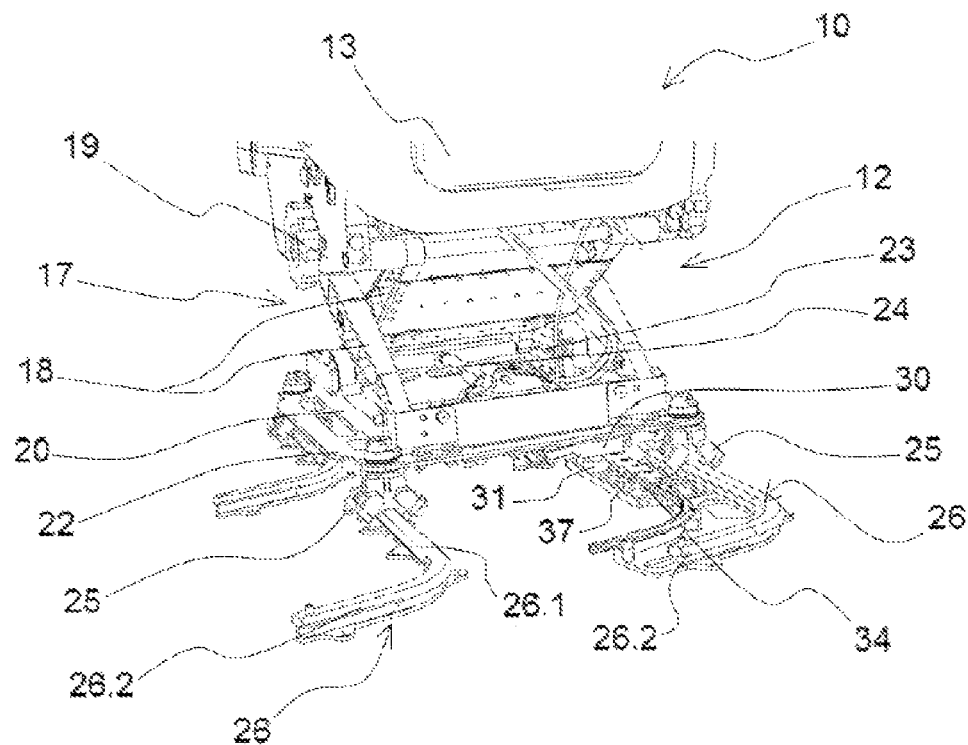
[Fig. 4]
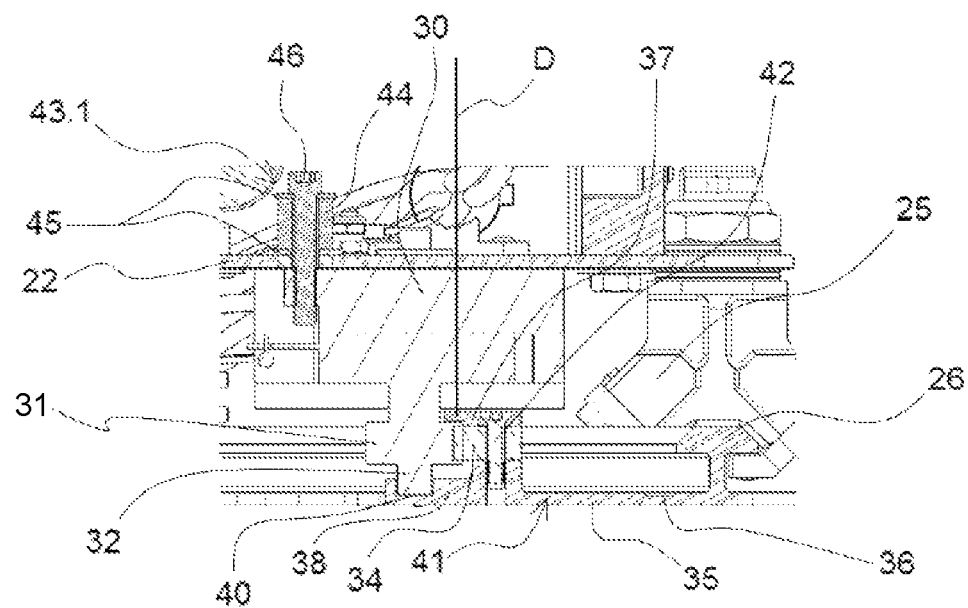

[Fig. 5]
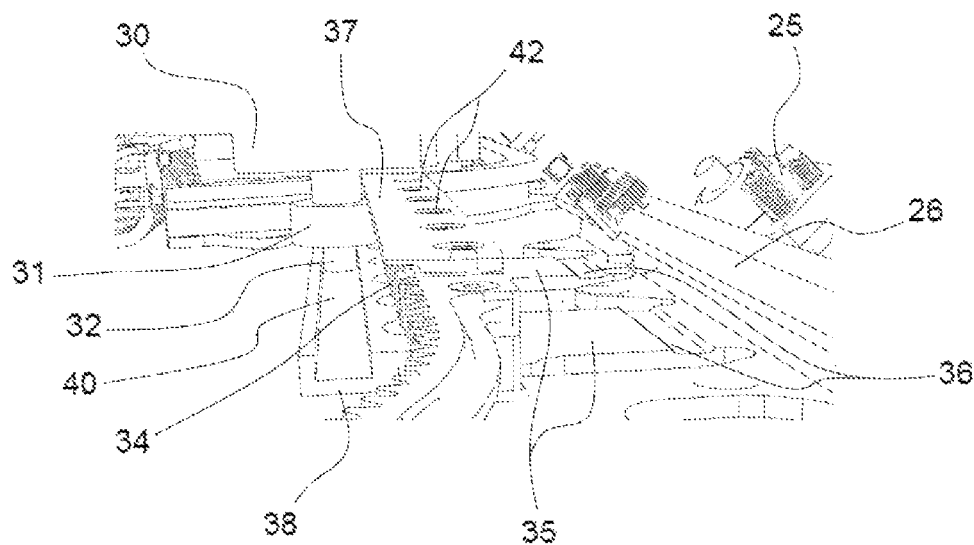
[Fig. 6]
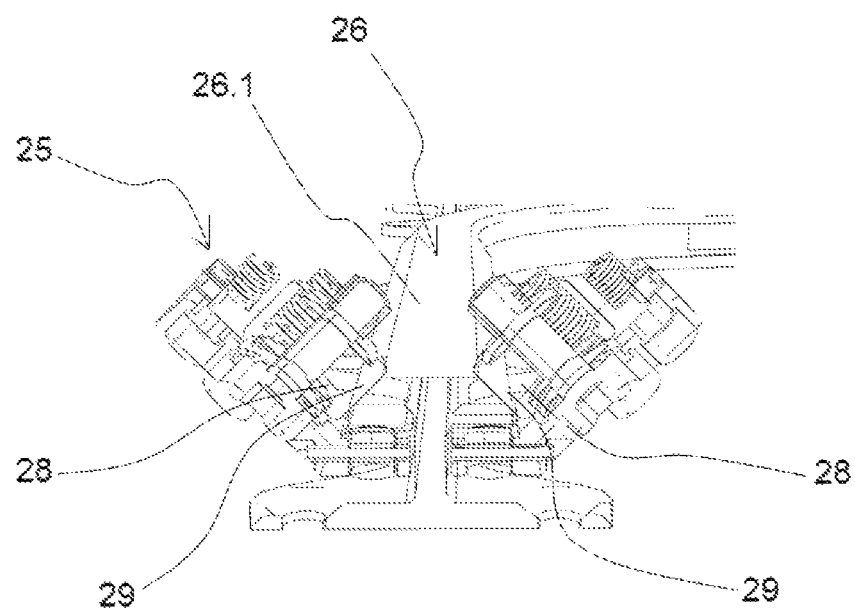

[Fig. 7a]
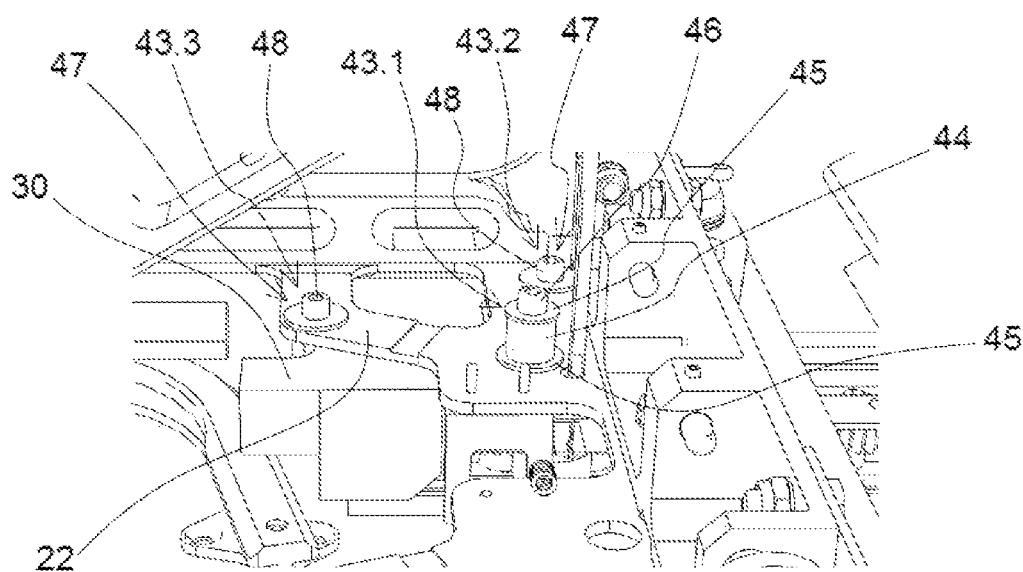
[Fig. 7b]
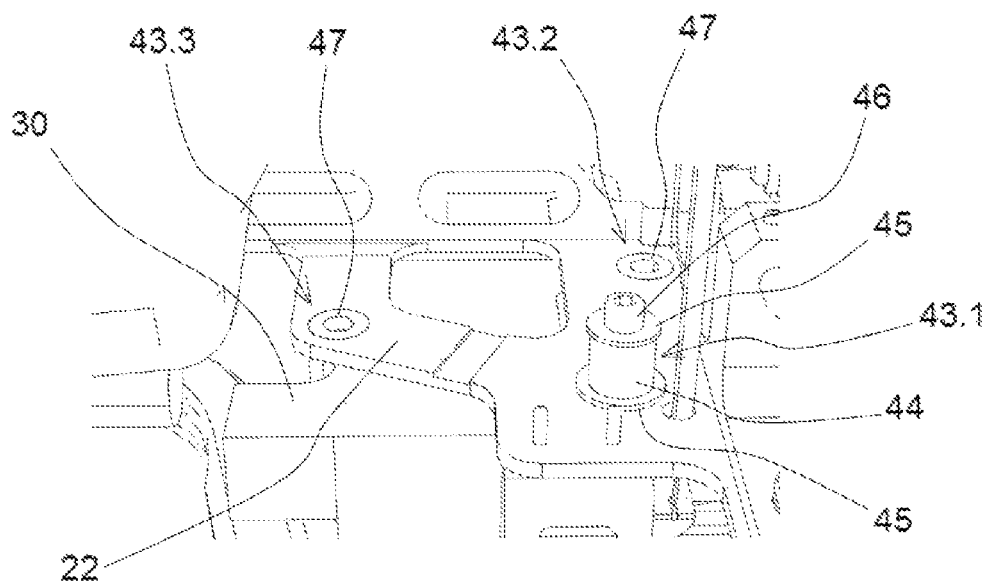

[Fig. 8a]
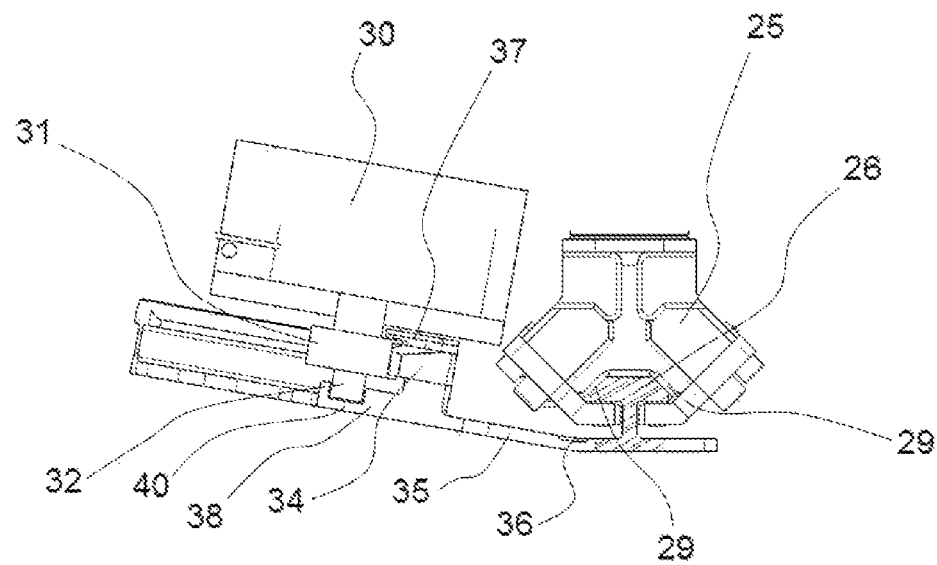
[Fig. 8b]
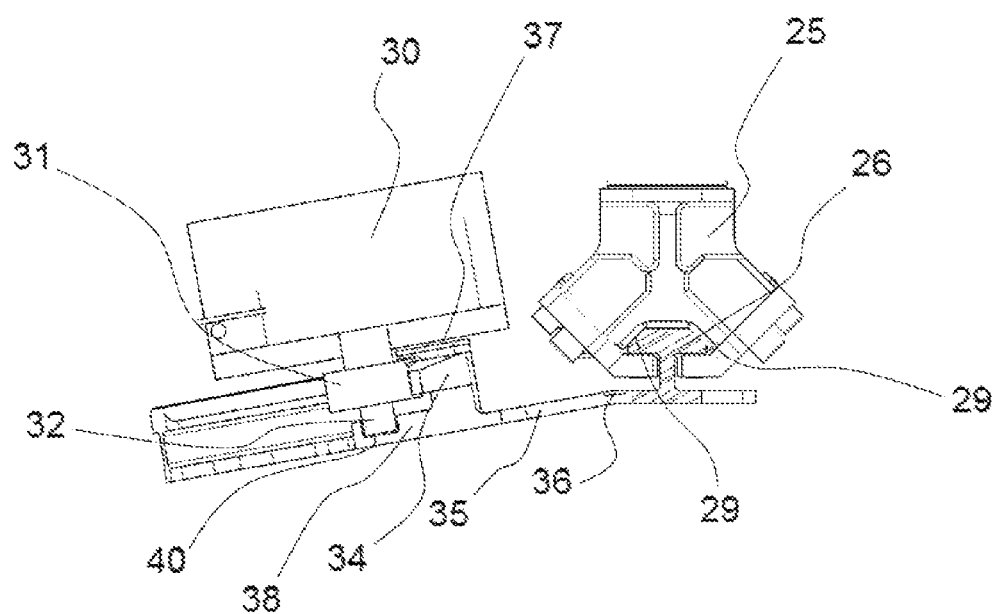

US 11,981,439 B2

AIRCRAFT SEAT PROVIDED WITH A RACK MOUNTED ON A DEFORMABLE PORTION

CROSS-REFERENCE TO RELATED APPLICATIONS

This application is a national stage application of International Patent Application PCT/EP2020/055305, filed on Feb. 28, 2020 and titled "AIRCRAFT SEAT PROVIDED WITH A RACK MOUNTED ON A DEFORMABLE PORTION," which application claims priority to France Patent Application No. 1902363, filed on Mar. 8, 2019, each of which are hereby incorporated by reference in their entireties.

The present invention relates to an aircraft seat provided with a rack mounted on a deformable portion. The invention finds a particularly advantageous, but not exclusive, application with piloting seats for an airplane or an helicopter.

In a manner known per se, an aircraft seat comprises rails which are fixed to a floor and along which the seat can move so as to allow the pilot to adjust his/her position relative to the piloting place. In order to allow an automatic movement of the seat, it is possible to provide an electric actuator equipped with a pinion on a shaft. The pinion meshes with a rack integral with a guiding rail.

During certification tests, a stress is applied to the floor during a so-called "pitch and roll" deformation phase. The result is the deformation of the seat structure and the movement of the corresponding actuator while generating a disengagement of the pinion from the rack. The seat movement control is then lost, which is a problem in terms of security.

The objective of the invention is to effectively remedy this drawback by providing an aircraft seat comprising:
 a guiding rail,
 a rack,
 an actuator equipped with a pinion carried by a shaft, said pinion meshing with the rack,
 at least one connecting portion providing a mechanical connection between the guiding rail and the rack,
characterized in that the connecting portion comprises a zone of low mechanical resistance and in that a first support element and a second support element are arranged on either side of the rack, so that in the event of a deformation of the seat causing a displacement of the pinion, said pinion or corresponding shaft bears against one of the support elements, in particular according to a direction of displacement of said pinion, so as to deform the connecting portion along the zone of low mechanical resistance.

The invention thus ensures the meshing of the pinion of the actuator with the rack in spite of the deformation of the seat, to the extent that the connecting portion is deformed so that the rack follow a displacement of the actuator generated by the deformation of the seat. This ensures that the teeth of the pinion remain in engagement with the teeth of the rack when the seat is deformed.

According to one embodiment, the first support element is a retaining plate having a portion axially superimposed with the pinion.

According to one embodiment, the second support element is a plate provided with a guiding groove capable of guiding one end of the shaft carrying the pinion.

According to one embodiment, the second support element, the connecting portion, and the guiding rail form one and the same part.

According to one embodiment, the actuator is fixed to a base of the seat by means of at least one damper pad.

According to one embodiment, a damper pad comprises an elastic portion for absorbing mechanical energy in a vertical direction.

According to one embodiment, a damping pad comprises an annular elastic portion arranged in a passage opening for a fixing member of the actuator, so as to be able to absorb mechanical energy in a longitudinal direction and/or a transverse direction.

According to one embodiment, a translational guiding member comprises rollers each cooperating with an inclined face of the guiding rail having a V-shaped cross section.

According to one embodiment, said aircraft seat comprises a height adjustment device.

According to one embodiment, the height adjustment device comprises two pairs of spiders provided with ends cooperating with upper flanges and lower flanges of said seat.

According to one embodiment, the zone of low mechanical resistance is obtained by a local shrinkage of material in a thickness of the connecting portion.

The subject of the invention is also an aircraft comprising a seat as defined above.

The present invention will be better understood and other features and advantages will become apparent on reading the following detailed description including embodiments, given as illustrative examples, with reference to the accompanying figures, given as non-limiting examples, which could be used to completely understand the present invention and the description of its implementation and which could eventually contribute to its definition, in which:

FIG. 1 is a perspective view of the front part of an aircraft seat according to the present invention;

FIG. 2 is a perspective view of the rear part of an aircraft seat according to the present invention;

FIG. 3 is a detailed perspective view of the seating structure of the seat according to the invention;

FIG. 4 is a detailed sectional view of the zone in which the pinion of the actuator meshes with the rack of a system for translating the seat according to the invention;

FIG. 5 is a detailed perspective view of the zone in which the pinion of the actuator meshes with the rack of the system for translating the seat according to the invention;

FIG. 6 is a sectional view of a guiding member meshing with an aircraft seat rail according to the present invention;

FIG. 7a is a perspective view of the damping pads used to ensure the fixation between the actuator carrying the pinion meshing with the rack and the base of the seat according to the invention;

FIG. 7b is a perspective view of the damping pads without fixing members so as to reveal the elastic portions of said pads;

FIGS. 8a and 8b are sectional views illustrating the movement of the actuator when the seat is subjected to stresses in two directions of movement opposite to each other.

It should be noted that, in the figures, the structural and/or functional elements common to the different embodiments may have the same references. Thus, unless otherwise stated, such elements have identical structural, dimensional and material properties.

Furthermore, the relative terms of the type "top", "bottom", "front", "rear" are understood by reference to the common sense that would be given to them by a person in the seat. A longitudinal direction X straightly extends from the rear to the front of the seat. A transverse direction Y is perpendicular to the longitudinal direction X while lying in a horizontal plane. A vertical direction Z is perpendicular to the plane formed by the longitudinal X and transverse Y directions.

FIGS. 1, 2, and 3 show an aircraft 10 notably including a seating surface 11 mounted on a seating structure 12, a backrest 13, and a headrest 15. The seating structure 12 comprises a height adjustment device 17 provided with two pairs of X-shaped spiders 18 mounted between two upper flanges 19 and two inner flanges 20 fixed on a base 22. The base 22 has in particular a form of plate opened in its central part. The spiders 18 of each pair are hinged relative to one another in their central portion.

The rear ends of the spiders 18 are connected so as to rotate only with respect to the lower flanges 20 and the upper flanges 19. The front ends of the spiders 18 are connected so as to rotate and translate along guiding grooves 23 respectively in the upper flanges 19 and lower flanges 20, as shown in FIG. 3. In other words, there is a sliding pivot type connection between the front ends of the spiders 18 and the flanges 19, 20 of the seating structure 12. The vertical displacement of the seat 10 may be limited by means of stops in the front part of the upper flanges 19 at one end of the guiding grooves 23.

Alternatively, the structure may of course be reversed without modifying the operation of the system, that is to say, the pivot connections may be disposed on the side of the front ends of the spiders 18 whereas sliding pivot type connection may be placed on the side of the rear ends of the spiders 18.

In order to ensure an automatic displacement of the seat 10 from top to bottom, a mechanical cylinder actuator 24 is arranged between the lower ends of the spiders 18, as can be seen in FIG. 3. The operation of the actuator 24 can be controlled by the pilot.

Furthermore, the base 22 carries translational guiding members 25 in each cooperating with a corresponding guiding rail 26 fixed on the floor of the aircraft. In this case, four guiding rails 26 are used here, but it would of course be possible to use more or less than four guiding rails 26. As can be seen in FIGS. 1 to 3, a rail 26 comprises a straight portion 26.1 corresponding to a zone of use of the seat 10 along which the seat 10 can be moved by more or less an adjustment length, in particular between 50 mm and 80 mm and of the order of 65 mm, with respect to an intermediate reference position.

A rail 26 also includes a curved portion 26.2 in which the seat 10 is located when it is in a stored position. The seat 10 is then out of the piloting place. Given that the curved portion 26.2 corresponding to the stored position of the seat 10 is not subjected to the same operating constraints as the straight portion 26.1 corresponding to the zone of use of the seat 10, the curved portion 26.2 of the rail 26 may be made of a different, in particular less resistant, material than that of the straight portion 26.1 of the rail 26. The cost of the system is thus reduced. According to a particular exemplary embodiment, the straight portion 26.1 of the rail 26 is made of a steel-based material, while the curved portion 26.2 is made of an aluminum-based material.

As illustrated in FIG. 6, a translational guiding member 25 comprises rollers 28 each cooperating with an inclined face 29 of the guiding rail 26 having a V-shaped cross section. The point of the V is located above the guiding rail 26. Such a configuration of the rail 26 and the guiding member 25 makes it possible to ensure a better centering of the guiding member 25 relative to the rail 26 while limiting the play in the transverse direction Y.

In order to ensure an automatic translational displacement of the seat 10 in the longitudinal direction X, it is provided an actuator 30 equipped with a pinion 31 carried by a shaft 32, as is clearly visible in FIGS. 4 and 5 in particular. The pinion 31 may be integral with the shaft or attached and fixed to the shaft 32. The pinion 31 meshes with a rack 34 integral with a guiding rail 26. For this purpose, at least one connecting portion 35 provides a mechanical connection between the guiding rail 26 and the rack 34. In this case, there are two connection portions 35 but this number may of course vary according to the application.

The connecting portion 35 comprises a zone of low mechanical resistance 36 to allow the deformation of the connecting portion 35 along said zone of low mechanical resistance 36 when the seat 10 is subjected to a mechanical stress, in particular of the "pitch and roll" type. The zone of low mechanical resistance 36 extends in the longitudinal direction X. The zone of low mechanical resistance 36 is preferably obtained by a local shrinkage of material in a thickness of the connecting portion 35. As a variant, it would be possible to achieve the zone of low mechanical resistance 36 in a less resistant material than the rest of the part.

In addition, a first support element 37 and a second support element 38 are arranged on either side of the rack 34.

The first support element 37 is a retaining plate 37. The retaining plate 37 comprises a portion axially superimposed with the pinion 31. Thus, at least one straight line D parallel to the axis of the pinion 31 intersects the pinion 31 as well as a portion of the retaining plate 37, as illustrated in FIG. 4. The retaining plate 37 has a length substantially equal to that of the straight portion 26.1 of the rack 34. By "substantially equal", it is meant that there can be a variation of more or less 10% between these two lengths. The retaining plate 37 has a width greater than that of the straight portion 26.1 of the rack 34 so as to obtain an axial superposition with the pinion 31.

As can be seen in FIG. 5 in particular, the second support member 38 is a plate provided with a guiding groove 40 for guiding one end of the shaft 32 carrying the pinion 31 in case of deformation of the connecting portion 35. The guiding groove 40 may include a straight part as shown and/or a curved part. The plate 38 has a length substantially equal to that of the straight portion 26.1 of the rack 34. The plate 38 has a width greater than that of the straight portion 26.1 of the rack 34 so as to obtain an axial superposition with the pinion 31.

The second support member 38, the connecting portion 35, and the guiding rail 26 advantageously form a single piece 41, as it is shown in FIG. 4. The fixation of the rack 34 and the retaining plate 37 on this part 41 can be made by means of fixation members 42, such as screws, inserted in fixing holes in the retaining plate 37, the rack 34, and the part 41. The rack 34 is then mounted tight between part 41 and retaining plate 37.

Advantageously, in order to limit the efforts on the rack 34 in case of deformation, the actuator 30 is fixed on the base 22 of the seat 10 by means of at least one damping pad 43, as illustrated in FIGS. 7a and 7b. In this case, three damping pads 43.1, 43.2, 43.3 are used but their number may of course vary according to the application and in particular to the mechanical stresses to which the seat 10 is subjected. The damping pad 43.1 comprises an elastic portion 44 mounted tight between two washers 45 with the help of a fixation member 46, such as a screw, so as to be able to absorb mechanical energy in the vertical direction Z. The elastic portion 44 has a greater height than its diameter.

Each of the damping pads 43.2, 43.3 comprises an elastic portion ring 47 in a passage opening for a fixation member 48 of the actuator 30, so as to absorb mechanical energy in a longitudinal direction X and/or a transverse direction Y. The elastic portion 47 has a diameter greater than its thickness. According to an exemplary embodiment, the elastic portions of the pads 43.1, 43.2, 43.3 could be made in particular of rubber or of a synthetic material of polymer type, for example.

In a normal operation, that is to say when the seat 10 does not undergo any deformation, there is a functional play between the pinion 31 and each support element 37, 38.

The operation of the system in case of deformation of the seat 10 causing a displacement of the actuator 30 and therefore of its pinion 31 is described below with reference to your FIGS. 8a and 8b.

As it is shown in FIG. 8a, in case of a deformation of the seat 10 causing a displacement of the pinion 31 upwardly, the pinion 31 comes into abutment against the retaining plate 37 so as to deform upwardly the connecting portion 35 along the zone of low mechanical resistance 36. Due to the maintenance of the relative position of the pinion 31 with respect to the rack 34 by means of the retaining plate 37, the engagement of the pinion 31 with the rack 34 is guaranteed.

As illustrated in FIG. 8b, in case of a deformation of the seat 10 causing the pinion 31 to move downwards, the shaft 32 of the pinion 31 bears against the bottom of the guiding groove 40 of the plate 38, so as to deform the connecting portion 35 downwards along the zone of low mechanical resistance 36. Due to the maintenance of the relative position of the pinion 31 with respect to the rack 34 by means of the plate 38, the engagement of the pinion 31 with the rack 34 is guaranteed. In addition, the groove 40 makes it possible to effectively guide the movement of the pinion 31 relative to the rack 34.

In all cases, the damping pads 43.1, 43.2, 43.3 absorb mechanical deformation energy so as to limit the stresses to which the rack 34 is subjected.

As a variant, the assembly formed by the retaining plate 37, the rack 34, and the connecting portion 35 forms an added part fixed to the rail 26 by means of fixation members, such as screws, rivets, studs, or any other fastening member suitable for the application.

Of course the different features, variants and/or embodiments of the present invention can be associated with one another in various combinations insofar as they are not incompatible or exclusive with one another.

Obviously, the invention is not limited to the embodiments described above and provided by way of example only. It encompasses various modifications, alternative forms and other variants a person skilled in the art may consider in the context of the present invention and in particular any combination of the various operating modes described above, which may be taken separately or in combination.

The invention claimed is:

1. An aircraft seat comprising:
   a guiding rail,
   a rack,
   an actuator equipped with a pinion carried by a shaft, said pinion meshing with the rack,
   at least one connecting portion providing a mechanical connection between the guiding rail and the rack,
   characterized in that the connecting portion comprises a zone of low mechanical resistance and in that a first support element and a second support element are arranged on either side of the rack so that, in case of a deformation of the seat causing a displacement of the pinion, said pinion or the corresponding shaft bears against one of the support elements so as to deform the connecting portion along the zone of low mechanical resistance, and
   characterized in that the second support element is a plate provided with a guiding groove suitable for guiding one end of the shaft carrying the pinion.

2. The aircraft seat according to claim 1, characterized in that the first support element is a retaining plate having a portion axially superimposed with the pinion.

3. The aircraft seat according to claim 1, characterized in that the second support element, the connecting portion, and the guiding rail form one and the same part.

4. The aircraft seat according to claim 1, characterized in that the actuator is fixed to a base of the seat by means of at least a damping pad.

5. The aircraft seat according to claim 4, characterized in that the damping pad has a resilient portion for absorbing mechanical energy in a vertical direction.

6. The aircraft seat according to claim 4, characterized in that the damping pad comprises an annular elastic portion placed in a passage opening for a fixation member of the actuator, so as to absorb mechanical energy in a longitudinal direction and/or a transverse direction.

7. The aircraft seat according to claim 1, characterized in that a translational guiding member comprises rollers, each cooperating with an inclined face of the guiding rail having a V-shaped cross section.

8. The aircraft seat according to any one of claim 1, characterized in that the aircraft seat comprises a height adjustment device.

9. The aircraft seat according to claim 8, characterized in that the height adjustment device comprises two pairs of spiders provided with ends cooperating with upper flanges and lower flanges of said seat.

10. The aircraft seat according to claim 1, characterized in that the zone of low mechanical resistance is obtained by a local shrinkage of material in a thickness of the connecting portion.

11. An aircraft characterized in that the aircraft comprises a seat as defined in claim 1.

* * * * *